March 31. 1925.                                              1,531,537
                          D. BOURQUE
                  STUD FOR SEPARABLE FASTENERS
                       Filed May 22, 1923
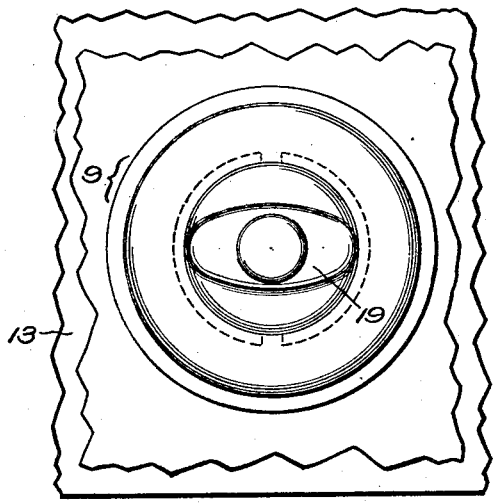
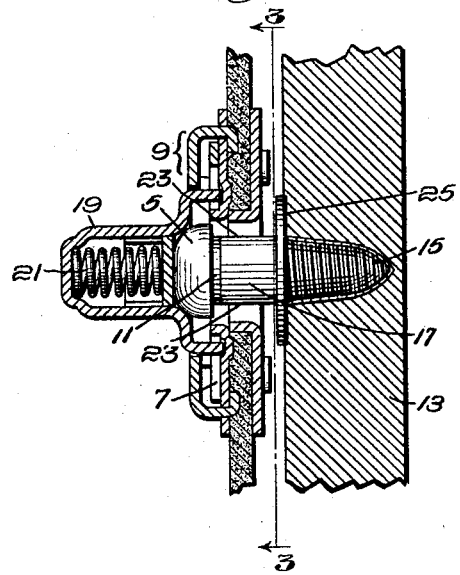
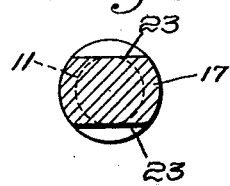
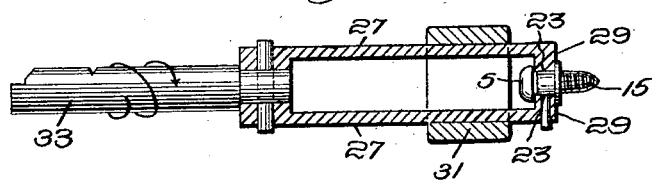
Inventor:
David Bourque,
by Emery, Booth, Janney & Varney
            Attys.

Patented Mar. 31, 1925.

1,531,537

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

STUD FOR SEPARABLE FASTENERS.

Application filed May 22, 1923. Serial No. 640,700.

*To all whom it may concern:*

Be it known that I, DAVID BOURQUE, a citizen of the United States, and a resident of Amesbury, county of Essex, State of Massachusetts, have invented an Improvement in Studs for Separable Fasteners, of which the following description, in connection with the accompanying drawings, is a specification, like characters on the drawings representing like parts.

This invention relates to stud and socket fasteners and the particular object thereof is to provide a form of stud which may be readily applied and will have a very neat appearance on the work.

My invention will best be understood by reference to the following description of an illustrative embodiment thereof shown by way of example in the accompanying drawings, wherein:

Fig. 1 is a front elevation of a stud and socket fastener;

Fig. 2 is a central vertical section through Fig. 1;

Fig. 3 is a section on the line 3—3 of Fig. 2; and

Fig. 4 is an elevation of the stud showing in longitudinal section a tool by means of which it may be secured to the work.

A large field for the use of separable fasteners of the stud and socket type is found in their application to the securing of a flexible member, such, for example, as a vehicle curtain to which the sockets are usually applied, to a relatively fixed member, for instance, the frame-work of the vehicle, which carries the studs. In the case of a vehicle curtain, for instance, when the curtain is rolled up the studs are exposed and it is desirable that they have a neat and seemly appearance and, quite apart from questions of neatness, they should project as little as possible from the work as otherwise they are likely to catch the clothing of persons passing nearby.

Referring first to Fig. 2 of the drawings, I have there shown a stud for a stud and socket fastener having the enlarged dome-shaped head 5 over which is pressed the jaw 7 of the socket 9 which snaps behind the shoulder of the head into engagement with the reduced neck 11. The fastener is secured to the supporting member 13 by means of a screw 15 and it has been customary in devices of this type to form the head 5 of the fastener with a slot to receive a screw driver to permit the stud to be inserted. This had the disadvantage that the end of the stud was rough and that the studs, particularly if made of brass, were likely to be damaged in inserting them so that they would not have a seemly appearance. In accordance with my present invention, therefore, the head 5 is unbroken exteriorly.

The head 5 is supported at a suitable distance from the member 13 by the shank 17 which should be of the shortest possible length to avoid undue projection of the stud from the work. In the illustrated embodiment of my invention I have shown the socket, which cooperates with the stud, as of the type shown in my Patent No. 1,367,350 having a manipulating portion 19 which serves to release the jaw 7 from behind the head of the stud and a kick-out spring 21. In a fastener of this type more particularly clearance is not needed between the socket and supporting member 13 as the socket does not have to be tipped or otherwise manipulated and therefore the shank 17 of the stud may be made exceedingly short.

I have herein shown (see Figs. 2 and 3) side portions of the shank 17 of the stud as cut away to provide the flat surfaces 23 by means of which the stud may be turned to drive in the screw 15. The head 5 of this stud may thus be left unbroken and the stud may still be driven home.

I am aware that it has been proposed to provide screw-in studs with enlarged hexagonal bases at the head end of the screw portion to accommodate a wrench, but in these instances the over-all length of the stud was increased as these enlarged bases lay at the end of the customary shank. I have herein illustrated (see Fig. 2) the base of the shank as provided with a flange 25 chiefly for the purpose of providing a neat finish and concealing any breaking of the fibers of the supporting member 13 which might be caused by driving in the screw, but this flange 25 may be made exceedingly thin as illustrated and will not increase the over-all length of the stud.

The stud may be readily screwed into the work 13, for example by the use of such tool as is shown in Fig. 4 and embodying a pair of spring arms 27 having opposed inwardly directed jaws 29 adapted to cooperate with the flattened surfaces 23, closing in on the same behind the head 5 of the stud. A sliding sleeve 31 may embrace the arms 27 and serve to hold the jaws 29 in gripping relation with the flattened surfaces 23 of the stud while permitting them to be readily released due to the resiliency of the arms 27 when the sleeve 31 is slid back toward the left viewing Fig. 4. The device just described may be provided with a suitable shank 33 by means of which it may be rotated, for instance, by means of a bit brace or a spiral screw-driver stock.

I have described in detail the particular form of my invention herein illustrated as an example thereof. The features of novelty exemplified in a detailed way by this disclosure and which I regard as new and desire to secure by Letters Patent I shall express in the following claims:

1. A stud for stud and socket fasteners having a dome shaped head which has a circular base, a substantially cylindrical neck supporting said head whereby said base presents an annular shoulder surrounding the neck, a short shank from which said neck extends, which shank terminates in an attaching screw, said shank having flattened sides to receive a turning tool whereby the screw may be driven.

2. A stud for stud and socket fasteners having a dome shaped head which has a circular base, a substantially cylindrical neck supporting said head whereby said base presents an annular shoulder surrounding the neck, a short shank from which said neck extends presenting shoulders in opposition to the shoulder of the head to define a groove at the neck, said shank terminating in an attaching screw and having side portions cut away to provide for gripping the same to drive the screw.

In testimony whereof, I have signed my name to this specification.

DAVID BOURQUE.